United States Patent [19]

Parsons

[11] 4,222,873
[45] Sep. 16, 1980

[54] PLATE AND FRAME FILTER PRESS HAVING MODIFIED FLOW PATTERN METHOD

[75] Inventor: Patrick J. Parsons, Edison, N.J.

[73] Assignee: Exxon Research & Engineering Co., Florham Park, N.J.

[21] Appl. No.: 936,173

[22] Filed: Aug. 23, 1978

[51] Int. Cl.² .............................................. B01D 29/08
[52] U.S. Cl. ................................... 210/777; 210/224; 210/790
[58] Field of Search ............... 210/224, 226, 227, 228, 210/229, 230, 231, 75

[56] References Cited

U.S. PATENT DOCUMENTS

| 393,633 | 11/1888 | Enzinger | 210/228 |
|---|---|---|---|
| 638,949 | 12/1899 | Ackermann | 210/224 |
| 656,212 | 8/1900 | Posch | 210/226 |
| 1,757,364 | 5/1930 | Heibig | 210/228 |
| 2,076,049 | 4/1937 | Seitz | 210/227 |
| 2,300,924 | 11/1942 | Hunziker | 210/227 |
| 2,590,242 | 3/1952 | Fusco | 210/228 |
| 3,330,414 | 7/1967 | Mecky | 210/227 |
| 3,363,768 | 1/1968 | Mecky et al. | 210/224 |

Primary Examiner—Theodore A. Granger
Attorney, Agent, or Firm—Roland A. Dexter; Frank T. Johmann

[57] ABSTRACT

Method of filtering wherein the filtration rate of and/or consumption rate of filter aid for difficultly filterable slurries is reduced for a plate and frame filter press having alternate solid plates supporting filter means, e.g. a composite clothpaper media and hollow frames for accumulation of filter aid and adapted for compression between a fixed half end plate and a movable half end plate by provision within said press of a chamber immediately adjacent to said movable half end plate, said chamber provided with at least one filtrate input and the sole means for exit of the filtrate from said press.

1 Claim, 6 Drawing Figures

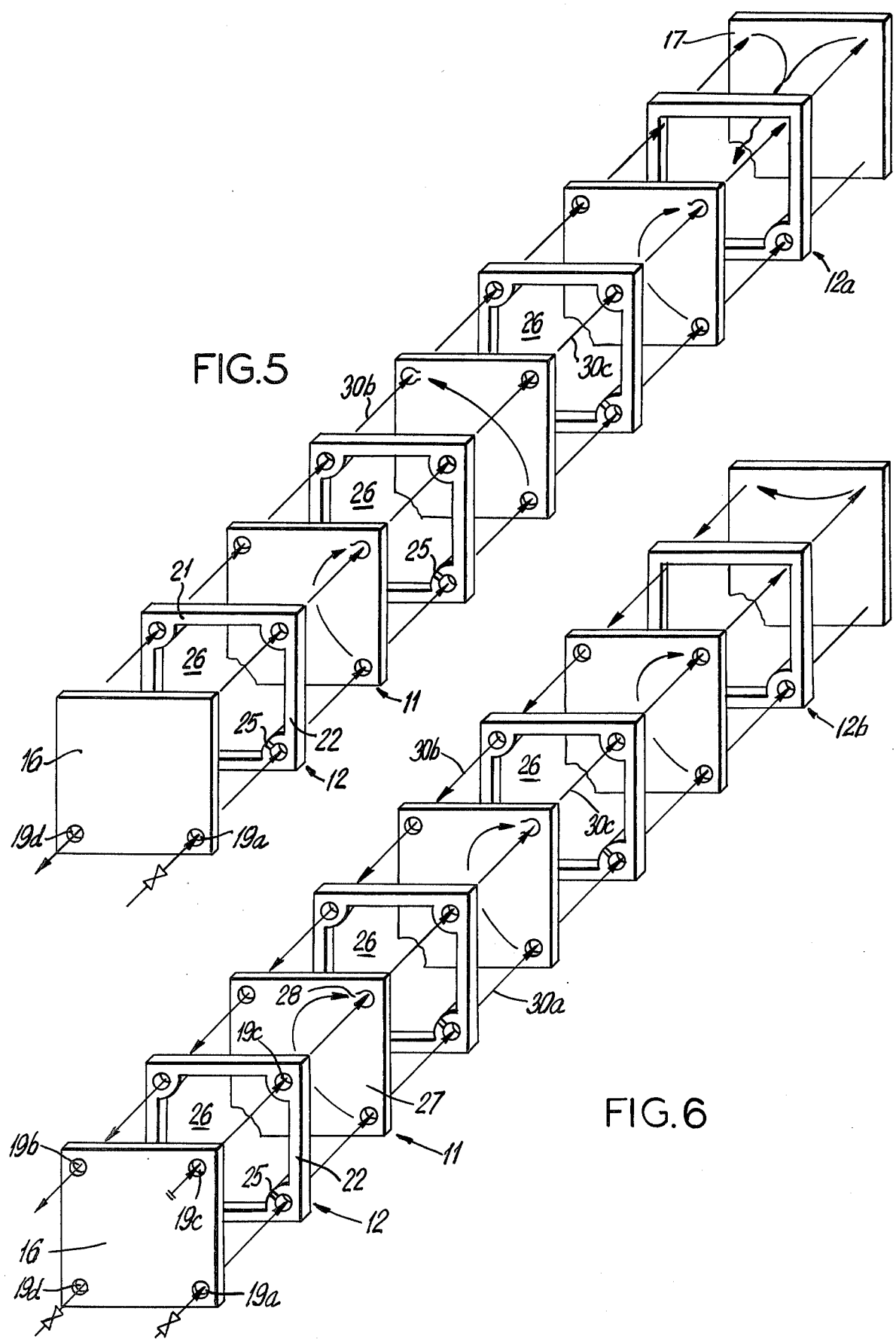

PLATE AND FRAME FILTER PRESS HAVING MODIFIED FLOW PATTERN METHOD

BACKGROUND OF THE INVENTION

The present invention concerns a plate and frame filter press. More particularly, the invention is concerned with a modification of a terminal frame utilized in such a press whereby the flow of filtrate through said press is altered in order to enhance the rate of filtration of difficultly filterable slurries.

Plate and frame filter presses are widely used throughout the chemical industry. Typically a plate and frame filter press consists of alternate solid plates supporting a filter means such as a filtering fabric, for example, in the form of a composite cloth-paper media or the like and hollow frames in which there is a provision for the accumulation of filter aid to prevent blinding of the filter means thereby facilitating the filtration of the slurry. Such presses have been widely used throughout the chemical industry for many years for recovery of solids only or the clarification of a liquid only or the recovery of both solids and filtrate. No matter how complex the results of filtration may be, the principles of these plate and frame filter presses with their alternating flush plates and frames and the filtering means are basically alike. After the filter means are in place between the plates and frames and a closing device has pressed them tightly together, then the material to be filtered is pumped into the press at the slurry inlet. It passes through the feed channel to all of the chambers formed by adjacent plates and frames where the filter means stop suspended solids and allows only the clear liquid to go through to the discharge channel, leaving the solids in the chambers.

Such a plate and frame filter press is described in U.S. Pat. No. 1,722,497. In this patent, it is seen that the plates and frames are provided with side lugs so that they can be positioned on the side bars of a press frame. Each of the filter plates and/or filter means per se is constructed and arranged to be engaged and clamped between two of the filter frames in the usual manner. Usually these filter plates are provided with a ribbed or waffled surface to support the filtering fabric and provide channels for the filtered fluid to pass along the face of the plate to the discharge ports of the filter plate. In this frame and plate assembly, the slurry is fed into the press by means of a top feed to each of the filter assemblies and the filtrate is collected therefrom by means of a pipe secured to the lower part or bottom of the filter press.

As noted above, the plate and frame filter press has remained basically the same through its evolution over the last one hundred years although the operating pressures have materially increased up to 250 psi and greater although normal operating pressures of 50–150 psi are used. The earlier metal plate and frames have been modified to take advantage of the newly developed engineering plastics which have further allowed for a wide diversity of structures with improved efficiency of filtration and reduced consumption of filter aid. In particular, the configuration of the plates and frames have been varied widely so as to provide not only for multiple feed ports but a washing capability whereby solubles can be dissolved or washed out of the filter cake while it still remains in the filter press chambers. Thus, there will be, in many instances, the presence of a wash channel separate from a feed channel which channels are provided through different corners of the plates and frames.

In the filtering of slurries, it is necessary that the filter means receive a layer of filter aid to ensure that each frame receive a minimal coverage in order to prevent the filter means from blinding. It has been found that after termination of a typical run on a plate and frame filter press, the front frames are completely filled with filter cake (the mixture of filter aid and filtered solids) with the thickness of the cake decreasing toward the rear of the press until the cake is approximately one-half the thickness of the cake in the front frames. For this reason, large quantities of filter aid are admixed with the slurry prior to filtration in order to ensure that the last frames in the rear portion of the filter press receive sufficient filter aid to prevent blinding of the associated filter means.

It is an object of this invention to provide a method to improve the filtration rate and/or filter aid consumption in the operation of a plate and frame filter press for the filtration of difficultly filterable slurries.

SUMMARY OF THE INVENTION

It has now been discovered that the foregoing comments and other disadvantages of the prior art plate and frame filter presses can be overcome by modification of the flow pattern of the filtrate through the press to provide that a filtrate discharge chamber is provided downstream of the rear filter plate immediately adjacent to the movable half end plate of the filter press. This has been accomplished by structure modification of the rear filter frame adjacent to the movable half end plate. The structure modification involves elimination of either two or three of the four holes in the corners of a conventional frame and not providing for, i.e. preventing, entrance of the slurry into the requisite filtrate discharge chamber. This modified frame is positioned between the movable half end plate and the adjacent rear filtrate plate. In one preferred form, the modified filter frame has one hole, however, almost as suitable is the frame without any hole, however, it is not readily fabricated from the conventional filter frame.

DESCRIPTION OF THE VIEWS OF THE DRAWINGS

FIGS. 5 and 6 show flow patterns from the presses employing the modified filter frames.

DETAILED DESCRIPTION OF THE INVENTION

Figure 1:
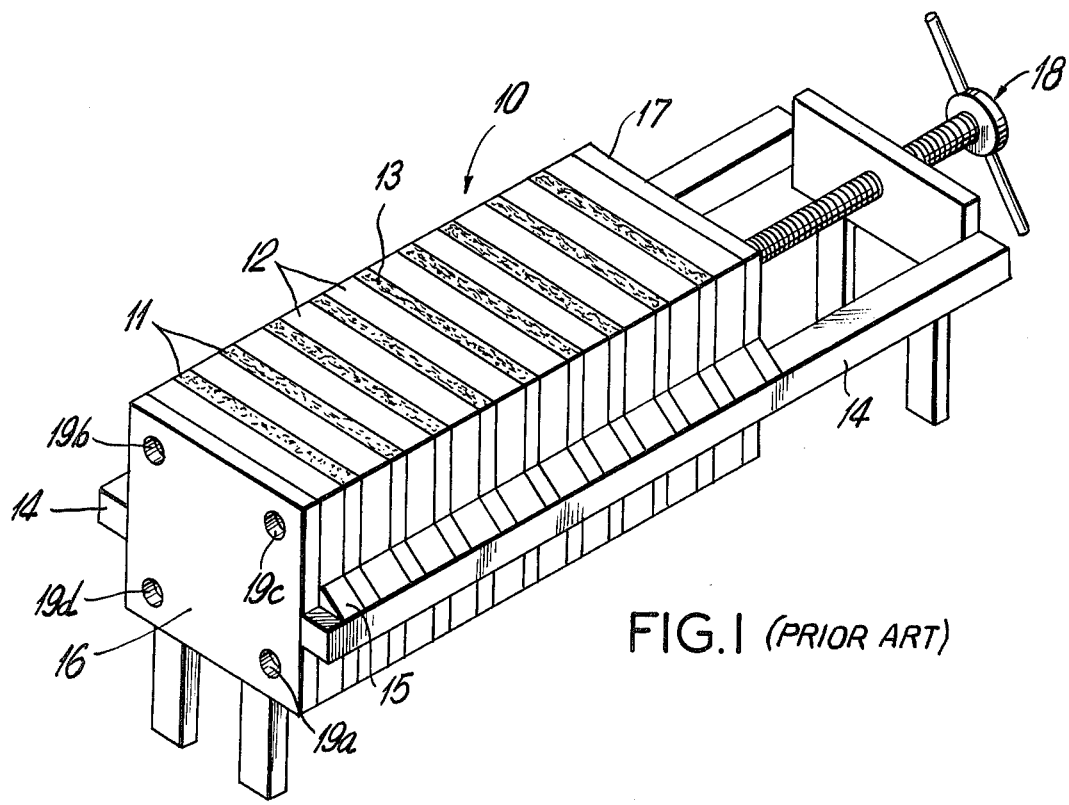
FIG. 1 shows a typical plate and frame filter press.

A conventional industrial plate and frame filter press is pictorially shown in FIG. 1. The plate and frame filter press 10 is an assembly of alternate solid plates 11, the faces (not visible in this figure) of which are waffled to allow drainage of the filtrate and the hollow filter frames 12 in which the filter cake accumulates during filtration. A filter means 13, usually a layer of filter paper over a cloth fabric, covers both faces of each filter plate 11. The filter plates 11 and filter frames 12 are hung in a vertical position on a pair of parallel support rails 14 by means of support lugs 15. During the filtration process, the plates 11 and frames 12 are pressed to a substantially liquid-type closure between two half end plates, one fixed half end plate 16 and one movable half end plate 17, by a capstan screw or some other closing device 18. Openings 19a, 19b, 19c and 19d in the corners of the fixed end plate 16 provide access to the passageways or pipes when the plates 11 and frames 12 are stacked together since the plates 11 and frames 12 are generally provided with similar holes. One of the openings 19a is used to introduce the unfiltered feed to the filter frames 12 where the solids in the feed are accumulated. Two of the openings 19b and 19c are normally used to remove the filtrate from the press 10. The last opening 19d is normally used to flow water or solvent along the passageway backwash the filter cake at the end of a filter run by means of wash ports in the plates. Backwashing provides for removal of many of the solubles in the filter cake while it is still in the filter press chambers. This backwash process is accomplished by passing water or an appropriate solvent through the cake by means of ports in the plates to dissolve the solubles in the cake and wash out filtrate remaining in the cake. The wash liquor produced by the backwash process is removed via opening 19b with opening 19c valved off.

Figure 2:
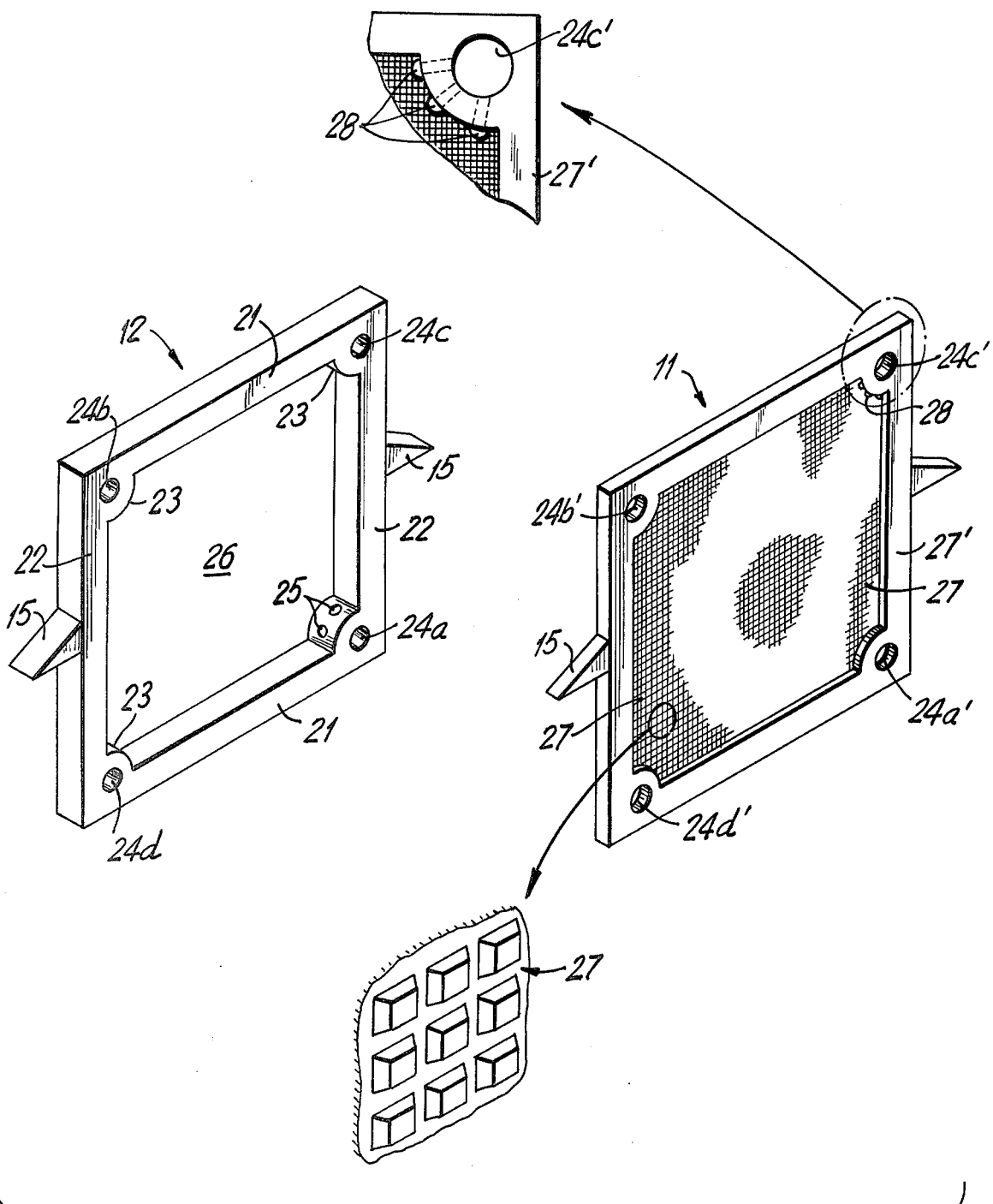
FIG. 2 shows the details of conventional filter plate and filter frame.

Referring now to FIG. 2, a typical standard filter frame 12 is shown. The rectangular frame 12 consists of two horizontal sections 21 and two vertical sections 22 joined at their ends. At each of the inside corners arched members 23 extend from the horizontal and vertical sections to provide holes 24a, 24b, 24c and 24d. Hole 24a is aligned with the feed opening 19a thereby creating part of the feed passageway or pipe. Similarly holes 24b, 24c and 24d are aligned with half end plate openings 19b, 19c and 19d respectively. At the inside corner arch forming the hole 24a feed ports 25 connecting the open area of the frame 12 to passageway provided by hole 24a whereby the unfiltered feed enters the filtration chamber 26 and it is in this filtration chamber 26 that the filter aid accumulates.

There is a support lug 15 on either side of the frame 12 enabling each frame to be properly aligned with the other alternating plates 11 and frames 12 of the press 10.

A representation of a standard filter plate 11 is shown in FIG. 2. In the conventional press 10 and as well as in the press 10 as modified according to this invention, the filter plate 11 configuration is unchanged. The filter plate 11 consists of a solid metal plate 27 with a raised area 27' around its edges to provide a gasketing surface when placed against filter frame sections 21 and 22. The raised region 27' encloses a continuous imperforate plate 27 both surfaces of which are waffled to provide support for the filter cloth-paper layers while allowing drainage of the filtrate from the plate area 27 to the filtrate exit passageway by means of filtrate exit ports. On the raised area 27', at the corners of the plate 11, there are holes 24a', 24b', 24c' and 24d' which match and are concentric with the corresponding holes 24a, 24b, 24c and 24d on the filter frame. One of the corners of the plate has the filtrate exit ports 28 which run underneath the raised area 27' between the front and rear waffled plate centers 27 and the corner hole 24c'. This allows the filtrate to leave an individual plate 11 and flow out of the filter press 10. The filter plate 11 also has support lugs 15 on either side. Both the front and the rear of the plate have the same details and configuration.

Figure 3:
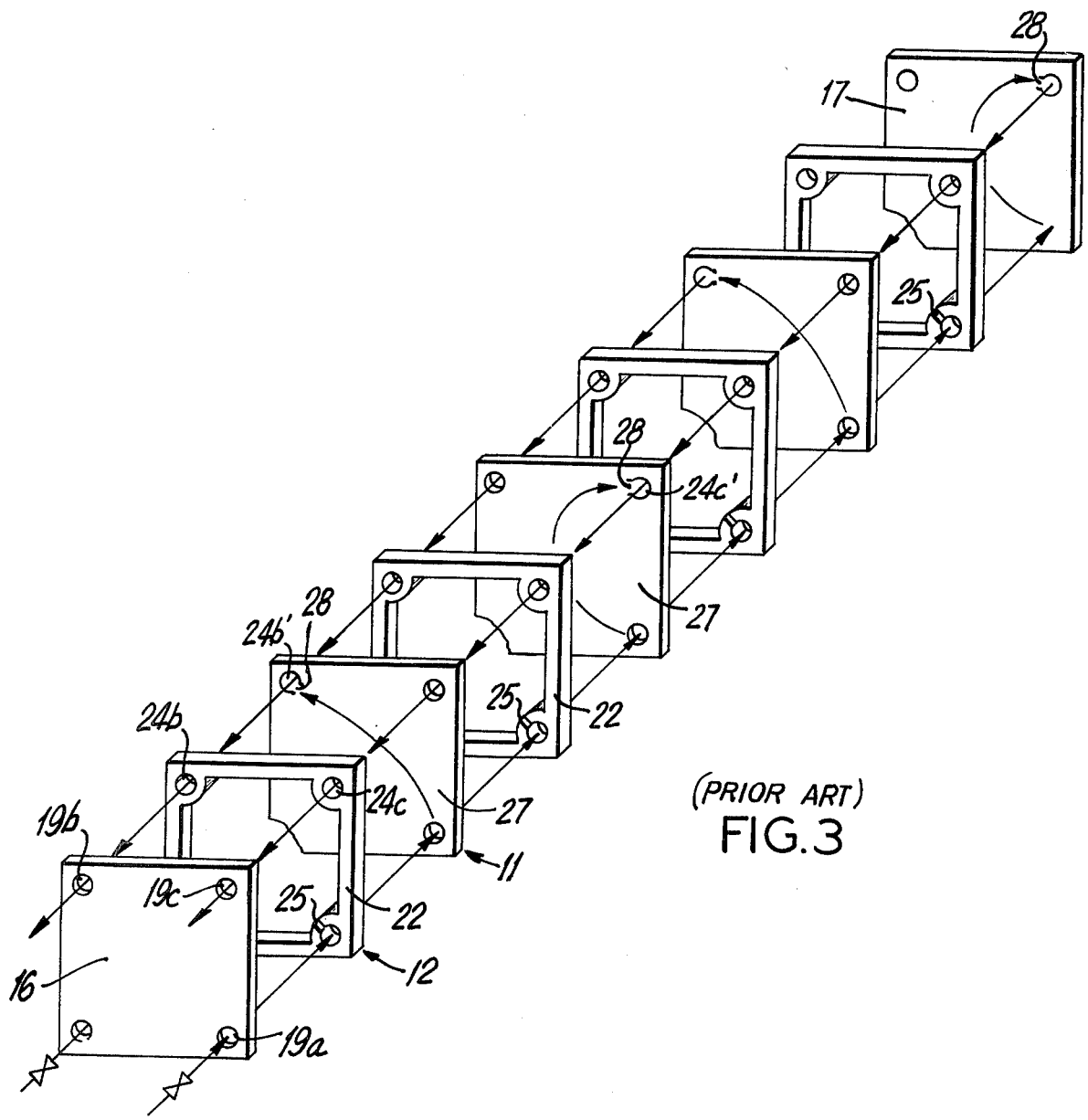
FIG. 3 is a simplified representation of the flow pattern from a conventional press.

The flow pattern of the filtrate and feed for the typical press 10 utilizing the plates 11 and frames 12 of FIG. 2 is shown in FIG. 3. In this simplified representation of the flow in a conventional press which can have up to 100 plates and frames, the feed to be filtered is fed into hole 19a and initially through the filter frame 22 with its feed ports 25. The filtrate then passes through the filter means flows along the waffled plate 27 to the filtrate exit ports 28 through hole 24b' in the plate 11 and from there back through the passageway in the frame 12 through the opening 24b to the exit hole 19b of the fixed half end plate 16. From FIG. 3, it will be seen that each subsequent plate is reversed from the preceding plate thereby causing the filtrate from exit port 28 to flow through the frame hole 24c and finally through opening 19c. In this arrangement, it allows use of both exit openings 19b and 19c of the fixed half end plate 16. Finally, in this flow representation, it is shown that the filtrate slurry mixture passes into the last frame 12 through feed port 25 and then the resultant filtrate flows into exit port 28 of this movable half end plate 17 and back through the passageway to opening 19c in the fixed half end plate 16 where it can be collected.

The consequence of this flow pattern which is embodied and illustrated in the conventional plate and frame filter press is that the pressure gradient across the filter means in the front of the press is much greater than the pressure gradient across the filter means in the rear of the press thereby creating a detrimental imbalance of fluid flow within the filter causing inefficiency of filtration.

It was an object of this invention to improve the filtration rate of the feed through the filter press and/or reduce the consumption of filter aid required for filtration of the feed. This has been accomplished by modification of the last filter frame 12, i.e. that frame which is contiguous with the movable half end plate 17. These modified filter frames 12a and 12b are pictured in FIG. 4. Frame 12a has one hole 41a whereas frame 12b contains two holes 41a and 41d. In neither of these frames 12a or 12b are there any feed ports 25 as are normally present in conventional frames 12 in the arch 23. Aside from the above-noted differences frames 12a and 12b are substantially the same as frames 12 being readily fabricated from frame 12 by removing the arches 23 from the appropriate corners. In practice, one need not have either hole 41a or 41d but is shown as such since frame 12a and 12b was modified from a conventional frame. The only requirement is that the feed does not flow directly into the rear chamber of the press. Thus one need only prevent feed flow from the last plate directly into said rear chamber as by any mechanical closure. By leaving arch 23 (no feed ports) with hole 41a in frame 12a or 12b, the movable half end plate 17 closes off the feed passageway and insures that no feed enters directly into the rear chamber space defined by the last frame 12a or 12b but rather must feed into the press through the feed ports 25 of the next to rear frame so that only the filtrate can enter into said rear chamber space. According to the invention, no filtration occurs in the rear or last filter frame.

Figure 4:
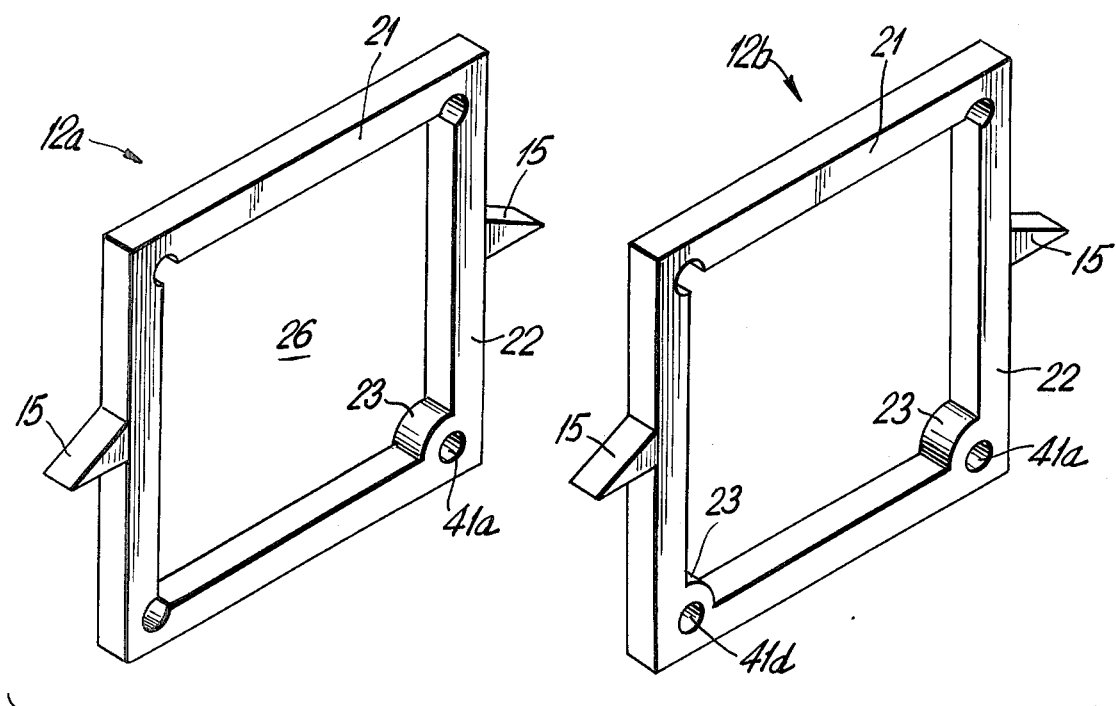
FIG. 4 pictures the modified filter frames.

The consequence of modifying the rear filter frame according to either of the configurations of FIG. 4 results in the flow patterns of FIGS. 5 and 6. The preferred modified frame 12a provides a flow pattern wherein the feed enters opening 19a and out into the first frame 12 through ports 25 into the volume 26 defined by the frame sections 21 and 22 for filtration and the filtrate subsequently flows via the waffled portion of plate 11. The filtrate flows into the exit ports 28 of the first plate 11 and into the filtrate passageway 30c defined by holes 24c'. However, with this modification, the feed entering into the second frame volume via ports 25 results in filtrate which can flow into either filtrate passageway 30c or 30b toward the rear chamber volume defined by the modified last frame 12a since openings 19b and 19c are closed off along with closure of the wash ports of the plates. The cumulative filtrate which has flowed into said rear chamber volume defined by the modified last frame 12a and its contiguous rear plate and the movable half end plate 17 then flows back through the passageways defined by the alternating plates and frames as illustrated until it emerges from opening 19d of the fixed half end plate 16 filtrate. Thus, the only filtrate exit of the press comes directly and solely from said rear chamber.

The flow pattern provided by modified frame 12b is diagrammatically presented in FIG. 6. The feed again enters through the opening 19a in the fixed half end plate 16 but in this instance opening 19b is provided for removal of the product filtrate. As the feed flows in through opening 19a, it passes out through feed ports 25 into the filtration chamber 26 where the filtrate passes through the filter and filter aid and leaves via the exit ports 28. In this approach the usually alternated successive plates are horizontally rotated such that the plate exit ports open into passageway 30c which leads to the rear chamber volume. From said volume the filtrate flows along passageway 30b to opening 19b.

In each of the modified embodiments according to the invention, it must be realized that all the fluid of the slurry passes or travels the same path length no matter which frame it passes through with all frames being exposed to approximately the same pressure differential. For this reason, all the frames will work at their full capacity for the entire run.

The invention will be further understood by reference to the following example which illustrates one preferred form of the invention and compares this embodiment with a filter press using the standard configuration of alternating plates and frames. It is to be understood that this illustration is not to be interpreted as a specific limitation on this invention.

EXAMPLE 1

A difficultly filterable slurry composed of approximately 0.2 wt.% solid particles in an oil-based slurry was subjected to filtration in a standard 36-inch Sperry plate and frame filter press manufactured by D. R. Sperry & Co. of North Aurora, Ill. and having 40 frames with alternating waffle-type plates using a filter paper-cotton cloth combination as the filter means. 1150 lbs. of diatomaceous earth filter aid was admixed thoroughly with about 100,000 lbs. of the slurry. The admixture was continuously fed into the press until a terminal pressure of 49 psig was developed after which filtration was terminated. Evaluation was made of the flow distribution in the filter press by means of an examination of the filter cake to determine the precoat and total cake thickness as a function of the frame number. This result was compared with a modified filter plate and filter press according to the invention by replacing the last plate with a modified plate of the configuration of that of 12b and horizontally reversing plates 1, 3, 5, 7, etc., (plates are numbered starting from the front full plate) along with closing openings 19c and 19d.

In the filter press employing the standard flow pattern, the total filter cake thickness generally decreased from the front to the 32nd frame. From the 32nd frame on, the filter papers were covered with a wet gelatinous sludge instead of the desired dry, firm filter cake. It was believed that this gelatinous sludge is a symptom of severe blinding so that it can be deduced that these frames receive little or no precoat. From this, it is possible that this poor distribution of precoat reduced the filter's capacity by up to 20%. In contrast, the precoat thickness in the filter employing the modified flow pattern resulting from the utilization of the modified filter frame 12b decreased rapidly from the front to the 16th frame. At frame 16 and beyond, the precoat thickness remained constant at ⅛". This thickness is more than sufficient to prevent the blinding of the filter paper which will allow for reduction of the precoat treat rate. In the filter employing the modified flow pattern, the total filter cake thickness varied by plus or minus 1/16" around an average value of 5/16". This indicates that the flow is more or less evenly distributed to all the frames. The results of this comparison are shown in the following Table I.

TABLE I

CAKE THICKNESS AS A FUNCTION OF FRAME
(in inches)

| Frame # | Press of the Invention Precoat | Press of the Invention Total | Conventional Press Precoat | Conventional Press Total |
|---|---|---|---|---|
| 1 | ⅛ | ⅞ | 5/16 | ⅞ |
| 4 | 5/16 | 1 | ¼ | 1 |
| 8 | ¼ | ⅞ | ¼ | ⅞ |
| 12 | 3/16 | 15/16 | 3/16 | ⅞ |
| 16 | ⅛ | 31/32 | 3/16 | ⅞ |
| 20 | — | — | ⅛ | ¾ |
| 24 | ⅛ | ⅞ | 1/16 | ¾ |
| 28 | ⅛ | ⅞ | 1/16 | ¾ |
| 32 | ⅛ | 15/16 | ↓ SLUDGE | ↓ |
| 36 | ⅛ | 31/32 | ↓ | ↓ |
| 40 | ⅛ | 31/32 | ↓ | ↓ |

| Total # Bags | | |
|---|---|---|
| Filter Aid | 28 | 23 |
| Terminal Press. | 49 psig | 50 |

Frame numbers increased from 1 to 40 from the front to the rear of the filter. Filter cake samples were taken from the upper left side of each frame.

The consequence of the modification of the filter plate in accordance with the invention and its utilization in a plate and frame filter press indicates that there will be a significantly reduced consumption of filter aid and that it is possible to achieve increased filtration rates and to increase the filter run length.

It is to be understood that the examples present in the foregoing specification are merely illustrative of this invention and are not intended to limit it in any manner; nor is the invention to be limited by any theory regarding its operability. The scope of the invention is to be determined by the appended claims.

What is claimed is:

1. A method of filtering solids from a slurry containing solids, using filter aid in a plate and frame filter press having a fixed end defining inlet and outlet ports, and a movable end, a plurality of alternating plates supporting filter means and frames for accumulation of said filter aid and solids, said plates and frames being held between said ends, said plates and frames defining a common feed line extending from said inlet port, a common filtrate line, and a series of passageways from said common feed line to said common filtrate line and across said filter means, said common filtrate line terminating in a filtrate chamber proximate said movable end, and a filtrate return passageway defined in said press extending from said chamber to communicate with said filtrate outlet port, said method comprising the steps of (a) flowing said slurry under pressure through said inlet port into said common feed line, (b) dividing said slurry into a number of streams by passage from said common feed line into said series of passageways, (c) filtering each of said divided streams as it passes across a filter means, (d) collecting the filtrate from each of said streams in said common filtrate line and passing it to said filtrate chamber proximate said movable end and (e) discharging all filtrate only from said chamber and through said filtrate return passageway defined in said press and terminating in said outlet port in said fixed end to an external collecting means, wherein all the fluid of the slurry travels the same path length through said press and all frames are exposed to approximately the same pressure differential whereby a substantially even distribution of solids and filter aid collects in each of said frames.

* * * * *